United States Patent [19]

Larsen et al.

[11] 4,238,349
[45] Dec. 9, 1980

[54] METHOD AND A COMPOSITION FOR INHIBITING CORROSION

[75] Inventors: Arthur L. Larsen, Saltsjöbaden; Sören J. Marklund, Saltsjö-Boo; Jan Rosenblom, Saltsjöbaden, all of Sweden

[73] Assignee: Malaco AG, Zug, Switzerland

[21] Appl. No.: 959,084

[22] Filed: Nov. 9, 1978

[51] Int. Cl.³ .............. C23F 11/14; C23F 11/12; E21B 43/22

[52] U.S. Cl. .............. 252/392; 252/8.55 D; 252/8.55 E; 252/394; 106/14.13; 106/14.18; 106/14.42; 422/12

[58] Field of Search ............... 252/392, 391, 8.55 D, 252/8.55 E, 394; 422/12; 106/14.13, 14.18, 14.42, 14.43

[56] References Cited

U.S. PATENT DOCUMENTS

| | | | |
|---|---|---|---|
| 3,119,447 | 1/1964 | Raifsnider et al. | 252/8.55 D |
| 3,121,091 | 2/1964 | Green | 252/391 |
| 3,629,104 | 12/1971 | Maddox | 252/8.55 E |
| 3,645,896 | 2/1972 | Larsen | 252/8.55 E |
| 3,712,863 | 1/1973 | Bundrant et al. | 252/8.55 E |
| 3,770,055 | 11/1973 | Larsen | 252/8.55 E |
| 3,976,593 | 8/1976 | Hartke et al. | 252/391 |

*Primary Examiner*—Benjamin R. Padgett
*Assistant Examiner*—Irwin Gluck
*Attorney, Agent, or Firm*—Fred Philpitt

[57] ABSTRACT

Corrosion of metals in contact with liquid systems is reduced by adding to the system a small amount of a hydrazine salt of an amido carboxylic acid containing at least one hydrophobic group. The hydrazine salt of the amido carboxylic acid is preferably used in combination with an ether amine or a quaternary ammonium compound. The hydrazine salt gives a substantial reduction of both general and localized corrosion and is particularly useful for preventing corrosion in different areas of oil recovery and in petroleum industry.

10 Claims, No Drawings
}

METHOD AND A COMPOSITION FOR INHIBITING CORROSION

The present invention relates to a method of treating corrosive systems to prevent corrosion of metals in contact with the systems and more particularly pertains to a method of preventing corrosion by utilization of hydrazine salts of amido carboxylic acids. The invention also relates to a composition for inhibiting corrosion.

In order to preserve metals, and particularly ferrous metals, in contact with corrosive liquids corrosion inhibitors are added to many systems including cooling systems, refinery units, pipelines, steam generators, oil production units etc.

Nitrogen compounds such a quaternary ammonium compounds, amines, fatty amine salts, amine salts of sarcosine derivatives etc. are wellknown corrosion inhibitors. These compounds are film-forming inhibitors, i.e. they are adsorbed on metal surfaces forming a protective film between the metal and the corrosive environment. Film-forming inhibitors of the mentioned kind are useful against corrosion arising from inorganic salts such as chlorides, sulfates, carbonates etc. dissolved gases such as carbon dioxide and hydrogen sulfide. Conventional nitrogen containing inhibitors do however often fail in systems containing certain combinations of dissolved gases such as hydrogen sulfide and oxygen, both important corrosion factors in liquid systems, especially in the petroleum industry.

An important type of corrosion is the serious localized corrosion caused by dissolved oxygen, carbon dioxide, hydrogen sulfide etc. Prevention of oxygen corrosion is usually effected by utilization of oxygen scavengers, the most common ones being sulfite and dithionite. Hydrazine can be used as an oxygen scavenger but is not satisfactory as it is unstable and toxic. Furthermore hydrazine has the disadvantage of being a slow reactant and it does not function satisfactorily at temperatures below about 50° C.

According to the present invention it has been found that a substantial reduction of corrosion of metal structures, such as ferrous pipes, tubings etc. is obtained by the utilization of hydrazine salts of amido carboxylic acids. The salts can be introduced into aqueous systems such as cooling systems, systems for hydrostatic testing, water flooding systems in oil recovery etc. and into organic systems, particularly hydrocarbon systems, such as pipelines and transmission lines, refinery units and chemical processing systems.

The present invention thus relates to a method of preventing corrosion of metals in contact with liquid systems which comprises adding to the systems an effective amount of a hydrazine salt of an amido carboxylic acid having the general formula R—X—(CH$_2$)$_n$COOH whereby X is the group

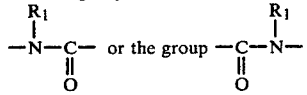

wherein R is an organic hydrophobic group having 5 to 22 carbon atoms, R$_1$ is hydrogen, a lower alkyl group having 1 to 4 carbon atoms, or has the same meaning as R, and n is a integer from 1 to 10. The organic hydrophobic group R may optionally contain inert substituents, i.e. substituents that do not adversely affect the anti corrosive properties of the molecule. As examples of inert, non-interfering substituents can be mentioned ether- and ester groups.

The group R is suitably a straight or branched aliphatic hydrocarbon group containing 5 to 22 carbon atoms and preferably containing 7 to 18 carbon atoms. R$_1$ is suitably hydrogen, a methyl, ethyl, propyl or butyl group and n an integer between 1 and 5 and X the group

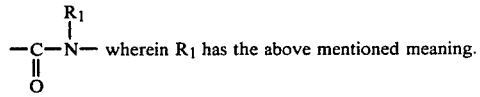

As examples of suitable hydrophobic groups R can be mentioned alkyl groups, such as octyl, decyl, hexadecyl and octadecyl groups, alkenyl groups, such as oleyl and linoleyl, and naturally occuring mixtures of such groups. Examples of suitable amido carboxylic acids for salt formation with hydrazine are N-methyl, N-carboxymethyl dodecyl amide, succinic acid monohexadecyl amide and adipic acid N,N-dioctyl monoamide.

The hydrazine salts used in the present process can be prepared by mixing the amido carboxylic acid and the hydrazine at room temperature or slightly elevated temperatures. The reaction medium can be water and/or organic solvents. As examples of solvents can be mentioned lower alcohols such as methanol, ethanol and isopropyl alcohol, glycols and aliphatic and aromatic hydrocarbons. The hydrazine salts can be inserted as corrosion inhibitors as solutions or dispersions of varying concentrations in the inert diluent in which they are prepared or as concentrates.

The hydrazine salts of the amido carboxylic acids give a good effect by the combined properties of corrosion inhibition and oxygen scavenging. It is believed that the effect depends on the transportation of the hydrazine to the metallic surfaces by the amido carboxylic acids whereby reducing conditions are produced at the actual surface in contrast to the conventional separate addition of an oxygen scavenger to corrosive systems. The introduction of hydrazine as a compound considerably lowers the toxic problems connected with the use of hydrazine by reducing the vapour pressure of the hydrazine.

It is within the scope of the invention that there might be a molar excess of the hydrazine or the amido carboxylic acid which for certain systems may enhance the effect. The hydrazine is suitably present in an excess of at least 0.1 moles with respect to the amido carboxylic acid, and preferably in a molar excess within the range of 0.1 to 1 moles.

Although the hydrazine salts as such give a satisfactory protection it has been found that the effect can be considerably enhanced by the presence of an amine or a quaternary ammonium compound and this constitutes another aspect of the invention. The amines can be primary, secondary or tertiary and may be mono-, di- or tri ether amines. The amines and the quaternary ammonium compounds suitably contain at least one hydrophobic organic group having 6 carbon atoms or more. The amines and the quaternary ammonium compounds may be substituted with hydroxyalkyl groups or be alkoxylated.

The method of the invention also comprises the addition to corrosive systems of a hydrazine salt of an amido carboxylic acid as defined in combination with an amine or a quaternary ammonium compound. The amine or the quaternary ammonium compound is suitably present in a molar ratio of at least 1:20 with respect to the hydrazine salt and preferably within the molar ratio of 1:10 to 10:10.

The quaternary ammonium compounds for use in combination with the salts can be represented by the general formula

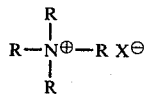

wherein at least one of the groups R is an organic hydrophobic group having 8 to 20 carbon atoms. The other substituents are independently alkyl or hydroxyalkyl groups having 1 to 4 carbon atoms, benzyl groups or alkoxy groups of the formula $(C_2H_4O)_pH$ or $(C_3H_6O)_pH$ where p is 2 to 10. The preferred anion in the quaternary anion in the quaternary ammonium compounds is chloride but this can of course be replaced by any other anion such as bromide-, ethylsulphate ion etc. As examples of suitable quaternary ammonium compounds can be mentioned dioctyl dimethyl ammonium chloride, dodecyl trimethyl ammonium chloride, cetyl trimethyl ammonium chloride, cetyl trimethyl ammonium bromide, dodecyl dimethyl benzyl ammonium chloride etc. Particularly good results have been obtained with quaternary ammonium compounds containing one organic hydrophobic group and one benzyl group, the other substituents being hydroxy alkyl or alkyl groups having 1 to 4 carbon atoms.

The amines for use in combination with the salts are ether amines having the general formula

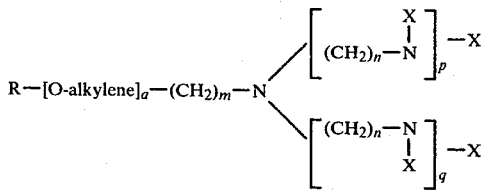

wherein R is an organic hydrophobic group containing at least 6 carbon atoms, a is an integer between 1 and 5, m an integer of 0 or 1, n an integer between 2 and 10, the groups X independent of each other are hydrogen, an alkyl group having 1 to 4 carbon atoms or the group (alkylene-O)$_y$H where y is 1 to 10, p is 0, 1 or 2 and q is 0 or 1, whereby however q is 0 when p is 2, and the alkylene group is an ethylene-, propylene or isopropylene group.

The ether amines may be used as free amines or in the form of water soluble salts such as chlorides, hydrochlorides, phosphates, sulfites, acetates, benzoates etc. They are preferably used as free amines or as sulfites or bisulfites.

Particularly preferred are the ether amines which can be represented by the general formula

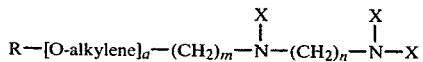

where the substituents and integers have above given meaning.

The organic hydrophobic group is suitably a straight or branched aliphatic hydrocarbon group containing 6 to 22 carbon atoms, preferably 8 to 18 carbon atoms and most preferably 8 to 12 carbon atoms.

As examples of suitable groups can be mentioned alkyl groups, such as heptyl, octyl, nonyl, decyl, dodecyl, hexadecyl, octadecyl, 2-ethylhexyl, 2-ethyl-4-methyl-pentyl, isononyl, isodecyl, isotridecyl, isohexadecyl, isooctadecyl, and alkenyl groups such as oleyl and linoleyl. The organic hydrophobic groups may also be mixtures of naturally occuring groups. In the groups (O-alkylene) it is understood that they can contain mixture of ethylene, propylene and isopropylene groups.

The substituent X in the ether amines suitably represents hydrogen or alkoxy groups where y is 1 to 10, preferably X is hydrogen. The integer a is preferably 1 or 2 and m is preferably 0 when a is 1 and 0 or 1 when a is greater than 1. The integer n is preferably 2 or 3.

Examples of suitable ether amines are 3-octoxypropyl amine, N(3-octoxypropyl) propylene diamine, N(3-decoxypropyl) propylene diamine, N(3-dodecoxypropyl) propylene diamine, N(2-octoxyethyl) ethylene diamine, N(2-decoxyethyl) ethylene diamine.

Combinations of hydrazine salt of amido carboxylic acids and ether amines are preferably used in the method. Besides the particularly good corrosion inhibiting effect of the combination, the ether amines have advantageous miscibility and solubility properties in water systems and they also have useful bactericidal properties.

In a particular embodiment of the present invention the amido carboxylic acid salts are used in combination with sulfites or bisulfites of the ether amines. The sulfites of the ether amines have good reducing properties and thus give excellent protection against localized corrosion. These compounds can be prepared by reacting sulfur dioxide or sulfurous acid with the ether amines in water, alcohols or mixtures of these at room temperature or slightly elevated temperatures. Hereby the ether amine can be reacted with one mole or less of $SO_2$ or $H_2SO_3$ per nitrogen atom in the amine.

The combination of hydrazine salt of amido carboxylic acid and ether amine or quaternary ammonium compound can be added to a corrosive system in the form of solutions or dispersions in water and/or organic solvents. As examples of solvents can be mentioned lower alcohols such as methanol, ethanol and isopropyl alcohol, glycols and aliphatic and aromatic hydrocarbons. Mixing of the components in the diluent can be carried out at room temperature or slightly elevated temperatures.

The invention also relates to compositions for prevention of corrosion of metals said compositions comprising the above defined hydrazine salts of the amido carboxylic acids in combinations with the above defined ether amines or quaternary ammonium compounds. The ether amines or the quaternary ammonium compounds are suitably present in the compositions in a molar amount with respect to the hydrazine salt of at least 1:20, preferably within the molar range of from 1:5 to 5:1. Preferred compositions contain the ether diamines.

The amount of hydrazine salts or active ingredients in composition containing these required for sufficient protection does of course vary with the corrosiveness of the systems. Methods for monitoring the severity of corrosion in different systems are well-known and serve as a basis for deciding the effective amount.

The hydrazine salts generally give a substantial reduction of corrosion when present in amounts of about 1 ppm based on the weight of the corrosive liquid. The upper limit is not critical but depends on the particular compound and the particular system. Amounts up to and above 1000 ppm can be used but preferably the concentration is within the range of 1 to 200 ppm.

The hydrazine salts of the present invention and compositions containing the same are particularly useful in the different areas of oil recovery and petroleum industry. They can be used in primary, secondary and tertiary oil recovery and added in a manner known per se. They can also be incorporated in water-soluble capsules which are introduced in the wells and when the capsules dissolve the inhibitor is slowly released into the corrosive fluid. Another technique in primary oil recovery where the present salts can be used is the squeeze treating technique whereby they are injected under pressure into the producing formation, are adsorbed on the strata and desorbed as the fluids are produced. They can further be added in the water flooding operations of secondary oil recovery as well as added to pipelines, transmission lines and refinery units.

The hydrazine salts of the invention can be used in combination with known inhibitors and oxygen scavengers and also in combination with additives generally used in the field such as anti-freezing agents, anti-fouling agents, surface active agents, e.g. nonionic dispersant and chelating agents.

The invention is further illustrated in the following examples which however are not intended to limit the same.

EXAMPLE 1

A hydrazinesalt of N-methyl, N-carboxymethyl oleylamide was prepared by dissolving 20 grams of the amidoacid in 50 grams of isopropanol and 25 grams of water. 1.75 grams of hydrazine dissolved in 3.25 grams of water was added and a clear solution of the hydrazine salt was obtained.

EXAMPLE 2

Corrosion Test

The product from example 1 and the separate components of the formulated product as well as the corresponding sodiumsalt and several other inhibitors were tested. All inhibitor formulations were made up in isopropanol and water as solvent.

The dosage in ppm is referring to the active part of the inhibitor i.e. not the solvent.

Test method 50 ml of crude oil and 950 ml of a brine solution with the following composition was poured into a 1000 ml E-flask.

| Component | % |
|-----------|------|
| NaCl | 4.4 |
| NaHCO$_3$ | 0.08 |
| CaCl$_2$ | 0.06 |
| MgCl$_2$ | 0.03 |
| MgSO$_4$ | 0.01 |
| water | 95.43 |

The mixture was vigorously stirred and CO$_2$ was bubbled through for 15 minutes giving a mixture saturated on CO$_2$ and with an oxygen content less than 0.5 ppm. The temperature was kept at 25° C. A polarisation resistance instrument (Magna Corrater) equipped with 1010 mild steel electrodes was used for the corrosion measurements. After the end of the period of 15 minutes, the electrodes were put into the brine solution. After 1 hour of stabilization of the corrosion rate a corrosion reading ($C_A$) was taken, then the inhibitor was added. After further 6 hours a final corrosion reading was taken ($C_B$). During the test a CO$_2$-saturated brine was obtained by continued injection of CO$_2$ into the solution.

Since different electrodes give different initial corrosion readings, a relative corrosion rate at the end of the test period was calculated.

Relative corrosion rate = $(C_B/C_A) \times 100$.

In the table the following abbreviations have been used:

| | |
|---|---|
| N-methyl, N-carboxymethyl-oleyl amide | CMO |
| Hydrazine | H |
| Sodium salt of N-methyl, N-carboxymethyl oleyl amide | CMONa |
| Hydrazine salt of N-methyl, N-carboxymethyl oleyl amide | CMOH |
| N-methyl, N-carboxymethyl lauryl amide | CML |
| Hydrazine salt of N-methyl, N-carboxymethyl lauryl amide | CMLH |

| INHIBITOR | MOLE RATIO | DOSAGE ppm | RELATIVE CORROSION RATE |
|-----------|-----------|------------|-------------------------|
| 0 | — | — | 100 |
| CMO | — | 30 | 30 |
| CML | — | 30 | 50 |
| CMOH | — | 30 | 1.5 |
| CMONa | — | 30 | 40 |
| CMLH | — | 30 | 3.0 |
| CMLH + 3-octoxy-propylamine | 1:1 | 30 | 1.0 |
| CMLH + dodecyl dimethyl benzyl ammonium-chloride | 1:1 | 30 | 0.2 |
| 3-octoxypropylamine | — | 30 | 80 |
| dodecyl dimethyl benzyl ammonium chloride | — | 30 | 40 |

We claim:

1. A method of preventing corrosion of metals in contact with liquid corrosive systems, characterized in that to the systems is added an effective amount of a hydrazine salt of an amido carboxylic acid having the general formula $R-X-(CH_2)_n COOH$ whereby X is the group

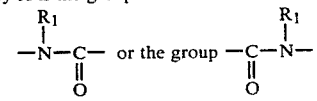

wherein R is an organic hydrophobic group having 5 to 22 carbon atoms, R$_1$ is hydrogen, an alkyl group having 1 to 4 carbon atoms, or has the same meaning as R, and n is an integer from 1 to 10.

2. A method according to claim 1, characterized in that R is a straight or branched aliphatic group having 7 to 18 carbon atoms, R$_1$ is an alkyl group having 1 to 4 carbon atoms and n is 1 to 5.

3. A method according to claim 1 och 2, characterized in that X is the group

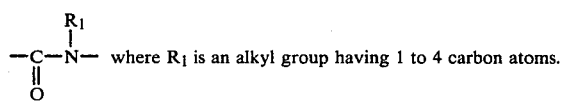 where $R_1$ is an alkyl group having 1 to 4 carbon atoms.

4. A method according to claim 1 or 2, characterized in that the hydrazine salt is added in combination with an ether amine or a quaternary ammonium compound whereby the molar ratio of amine or ammonium compound to the hydrazine salt is at least 1:20.

5. A composition for the prevention of corrosion of metals in contact with liquid systems, said composition containing a corrosion preventing amount of a hydrazine salt of an amido carboxylic acid having the general formula $R—X=(CH_2)_n COOH$ whereby X is the group

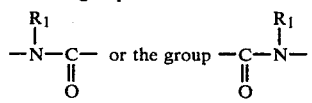

wherein R is an organic hydrophobic group having 5 to 22 carbon atoms, $R_1$ is hydrogen, an alkyl group having 1 to 4 carbon atoms, or has the same meaning as R, and n is an integer from 1 to 10.

6. A composition according to claim 5 which additionally includes an ether amine or a quaternary ammonium compound containing an organic hydrophobic group having 6 carbon atoms or more, whereby the molar ratio of ether amine or quaternary ammonium compound to the hydrazine salt is at least 1:20.

7. A composition according to claim 6, characterized in that the ether amine has the general formula

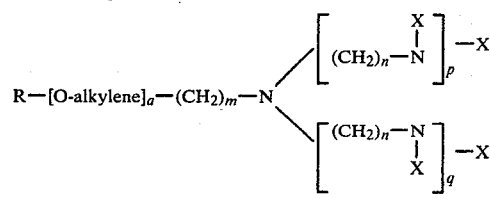

wherein R is an organic hydrophobic group containing at least 6 carbon atoms, a is an integer between 1 and 5, m is 0 or 1, the groups X independent of each other are hydrogen, an alkyl group with 1 to 4 carbon atoms or the group (alkylene-O)$_y$H where y is 1 to 10, p is 0, 1 or 2 and q is 0 or 1, whereby however q is 0 when p is 2, and the alkylene group is an ethylene-, propylene or isopropylene group.

8. A composition according to claim 7, characterized in that the ether amine is in the form of a sulfite or bisulfite.

9. A composition according to claim 6, characterized in that the quaternary ammonium compound has the general formula

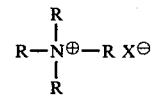

wherein at least one of the groups R is an organic hydrophobic group having 6 carbon atoms or more and the other substituents independently are alkyl or hydroxyalkyl groups having 1 to 4 carbon atoms, benzyl groups or alkoxy groups of the formula $(C_2H_4O)_pH$ or $(C_3H_6O)_pH$ where p is 2 to 10 and X is an anion.

10. A composition according to any of claims 7 or 8 or 9 or 6, characterized in that the molar ratio of ether amine or quaternary ammonium compound to the hydrazine salt is within the range of from 1:5 to 5:1.

* * * * *

UNITED STATES PATENT AND TRADEMARK OFFICE
CERTIFICATE OF CORRECTION

PATENT NO. : 4,238,349

DATED : December 9, 1980

INVENTOR(S) : Arthur L. Larsen et al.

It is certified that error appears in the above-identified patent and that said Letters Patent is hereby corrected as shown below:

On the title page page insert Item --[30] Foreign Application Priority Data

November 16, 1977 [SE] Sweden           7712957-5--.

Column 7, claim 5 should read as shown below:

5. A composition for the prevention of corrosion of metals in contact with liquid systems, said composition containing a corrosion preventing amount of a hydrazine salt of an amido carboxylic acid having the general formula $R-X-(CH_2)_n COOH$ whereby X is the group

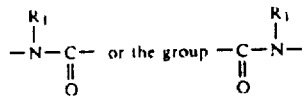

wherein R is an organic hydrophobic group having 5 to 22 carbon atoms, $R_1$ is hydrogen, an alkyl group having 1 to 4 carbon atoms, or has the same meaning as R, and n is an integer from 1 to 10.

Signed and Sealed this

Twenty-sixth Day of July 1983.

[SEAL]

Attest:

GERALD J. MOSSINGHOFF

Attesting Officer      Commissioner of Patents and Trademarks